Oct. 21, 1958 H. D. FLICKER Re. 24,552

WINDOW SASH MOUNTING AND LOCKING ARRANGEMENT

Original Filed April 14, 1953 2 Sheets-Sheet 1

INVENTOR.
HOWARD D. FLICKER

BY James and Franklin

ATTORNEYS

WINDOW SASH MOUNTING AND LOCKING ARRANGEMENT
Original Filed April 14, 1953 2 Sheets-Sheet 2
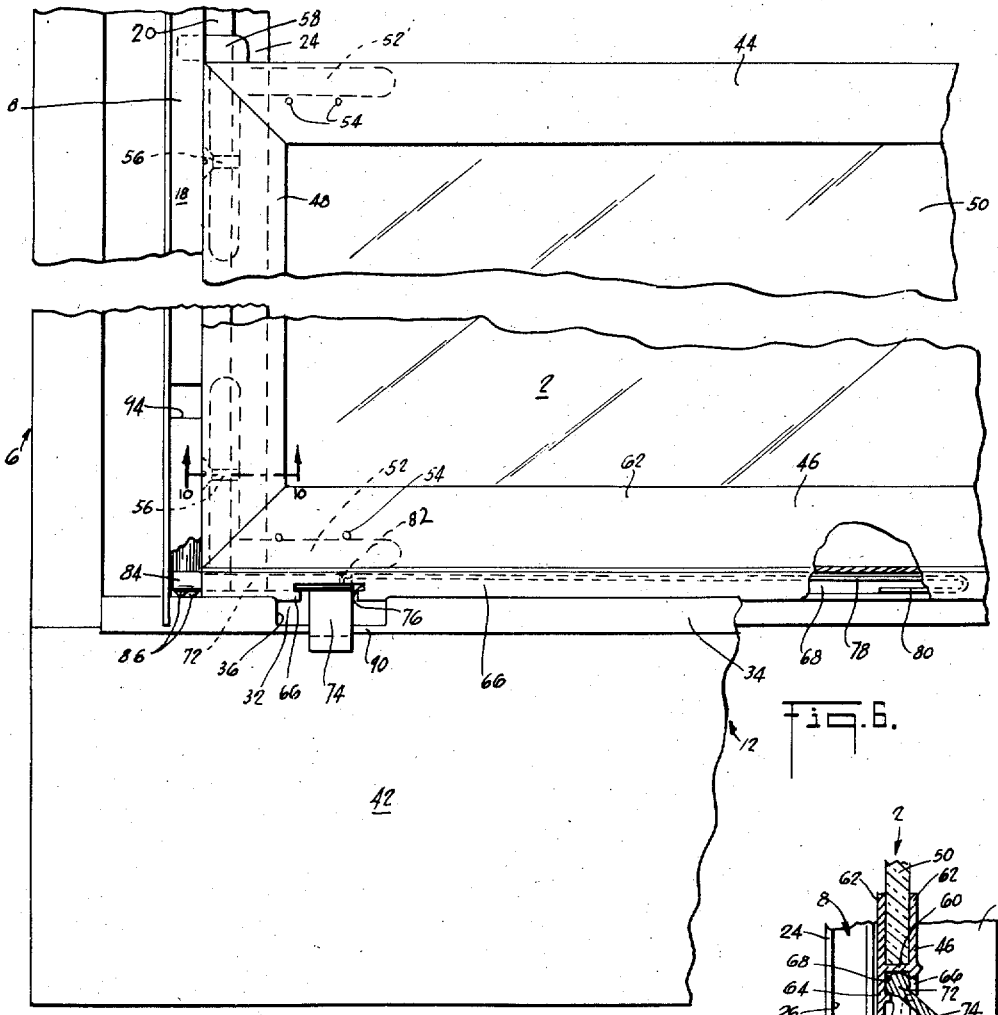
Fig. 6.
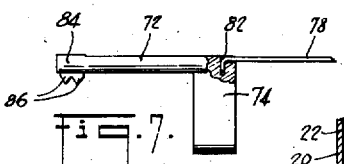
Fig. 7.
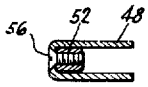
Fig. 10.
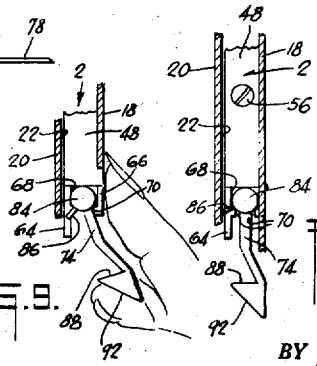
Fig. 9.
Fig. 8.
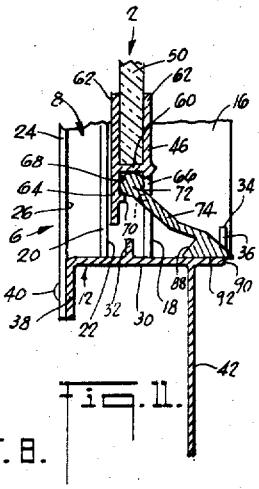
Fig. 11.
INVENTOR.
HOWARD D. FLICKER
BY James and Franklin
ATTORNEYS United States Patent Office Re. 24,552
Reissued Oct. 21, 1958

24,552

WINDOW SASH MOUNTING AND LOCKING ARRANGEMENT

Howard D. Flicker, Queens Village, N. Y., assignor, by mesne assignments, to Unexcelled Chemical Corporation, New York, N. Y., a corporation of New York Original No. 2,730,776, dated January 17, 1956, Serial No. 348,760, April 14, 1953. Application for reissue August 30, 1956, Serial No. 607,542

19 Claims. (Cl. 20—52.2)

Matter enclosed in heavy brackets [ ] appears in the original patent but forms no part of this reissue specification; matter printed in italics indicates the additions made by reissue.

The present invention relates to a novel mode of mounting window sashes in a frame, by means of which the position of the sashes in the frame may be adjusted, the sashes remaining in whatever position they may be placed, and by means of which the sashes, when moved to closed position, will be securely locked in that position and can be unlocked only from the inside of the room into which the window opens.

Counterweights are commonly used to mount window sashes in frames so that they may be moved between closed and open positions and reliably remain in any desired position. However, the use of counterweights involves considerable extra expense. In the absence of counterweights, numerous types of locking devices have been proposed, mounted on the sash and manipulatable so as to engage portions of the frame and frictionally hold the sash in adjusted position. These locking devices play no part in the mounting of the sash within the frame, but instead constitute extra equipment and hence involve extra expense. Moreover, such locking devices have usually prevented movement of the sash either up or down, and consequently have had to be released before the sash could be moved in either direction.

The present invention provides a simplified mounting structure by means of which the sash is slidably mounted on the window frame, and a part of that mounting structure itself constitutes the means for retaining the sash in any position in which it may be placed, and without the use of counterweights or any other extra equipment. Thus a manifold advantage over prior art constructions is gained. The mounting structure per se is so much simpler than prior art mounting structures as to materially reduce the cost of the window. The mounting structure is so designed as to prevent rattling of the window within the frame. At the same time it reliably retains the sash in any position in which it may be placed. In addition, in its preferred form, the mounting arrangement will only prevent the sash from being lowered, and consequently the sash may be manually raised without having to release the retaining mechanism.

The present invention is particularly well adapted for use in windows having metallic frames and sashes, because of the ease of fabrication of the various parts thereof, and it is here specifically illustrated as embodied in a window the structural portions of which are made of aluminum. Aluminum has met with particular favor in this field because it may readily be extruded in the irregular cross-sectional shapes which are generally required and because of its structural and corrosion-resistant characteristics. It is to be especially noted that the present invention permits the construction of a window having but a minimal number of extruded parts, those parts having a much less complex configuration than has previously been thought necessary. This factor, too, lessens the cost of windows made according to the present invention as compared to prior art structures.

When window sashes are moved to closed position, some means is generally required to positively lock them in that position so that they cannot be opened from the outside. This is particularly important where the windows are located on the ground floor or opposite a ledge, so that would-be intruders might have access to them. The structure of the present invention is so designed that when the sashes are fully closed they cannot be moved in either direction from the outside of the window, but only from the inside thereof. Each of the sashes is provided with a manually manipulatable member which, when moved, releases the retaining means and permits the sash to be lowered. The member on the upper sash, which is conventionally located behind the front sash when viewed from the interior of the room, cannot well be mounted so as to project to the front of the upper sash, for if it did it would either obstruct movement of the front or lower sash or would require such a space between the sashes as to prevent sealing of the window opening when the sashes are closed. Consequently the member controlling the retaining means of the upper sash projects downwardly therefrom, and thus is exposed at the outside of the window to the rear of the lower sash. However, the retaining mechanism is so constructed that its controlling member must be moved forwardly to release the retaining mechanism, and the lower sash is so positioned as to obstruct such forward movement of the upper sash member whenever the lower sash is in lowered position. Consequently, even though the member on the upper sash adapted to release its retaining mechanism is accessible from the outside of the window, it cannot be moved to permit the upper sash to be lowered unless the lower sash is raised. The member on the lower sash adapted, when moved, to relese the retaining mechanism of said lower sash is so formed as to positively lock with the inside of the window sill when the lower sash is substantially fully lowered. The lower sash member is therefore accessible only from the inside of the window, and its locking interengagement with the window sill can only be released through manipulation from the inside of the window. Thus the lower sash, when lowered, cannot be lifted from the outside, and because it cannot thus be lifted, the upper sash cannot be lowered from the outside. In this way positive security of closure is achieved in a simple manner, and without having to employ any separate equipment or attachments.

The members which extend from the sashes and movement of which is required in order to release the sash retaining means are so constructed and so movable that they constitute handles for the sashes. When they are grasped and moved to a position in which the retaining means is released or rendered inoperative, the sash then being freely lowerable or raisable, they project forwardly from the sash and are connected to the sash in such a way as to permit the person holding them to control the movement of the sash to the desired adjusted position, the members automatically springing back, when released, to a position such that the retaining mechanism is operative to hold the sash in position. Hence the retaining means is automatic and positive in operation, and the operation of releasing the retaining means inherently produces handles by which the sash may be raised or its descent may be controlled.

Although the present invention is disclosed as embodied in sashes containing panes of transparent glass, other types of sashes, such as screen sashes, opaque sashes or the like could also be employed. Indeed, the very simplicity of the mounting structure permits ready interchangeability of sashes from one type to another, or ready removal of a sash for purposes of repair, such removing and replacing being easily accomplished without the use of tools and without the application of any mechanical skill.

To the accomplishment of the above, and to such other objects as may hereinafter appear, the present invention relates to the window sash mounting and locking arrangement as defined in the appended claims and as described in this specification, taken together with the accompanying drawings, in which:

Fig. 6 is a fragmentary view on an enlarged scale, partially broken away, showing the manner in which the lower sash is mounted in the side rail of the window frame and showing the construction and arrangement of the retaining means;

Fig. 7 is a front elevational view, partially broken away, of the combination mounting and retaining means;

Fig. 8 is a fragmentary cross sectional view, taken along the line 8—8 of Fig. 2 and showing the operative position of the retaining means, only the retaining means of the lower sash being shown;

Fig. 9 is a view similar to Fig. 8 but showing the position of the parts when the retaining means is moved to inoperative released position;

Fig. 10 is a detail cross sectional view of a portion of the side sash frame, taken along the line 10—10 of Fig. 6; and Fig. 11 is a cross sectional view taken along the line 11—11 of Fig. 1 but showing the position of the parts when the lower sash is slightly above its fully closed position.

Figure 3:
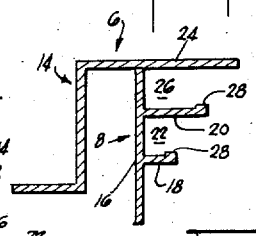
Fig. 3 is a cross sectional view, taken along the lines 3—3 of Fig. 2, of one of the side rails of the window frame.
Figure 4:
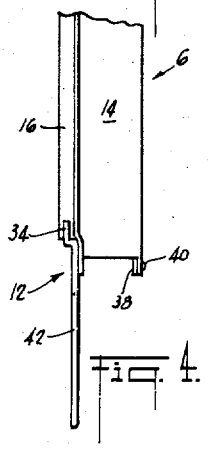
Fig. 4 is a fragmentary side elevational view of the window frame.
Figure 5:
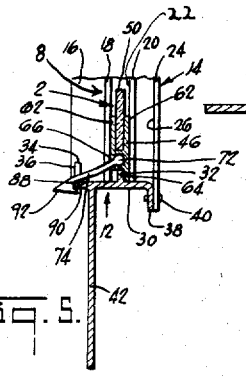
Fig. 5 is a cross sectional view taken along the line 5—5 of Fig. 1 and showing the manner in which the handle means on the lower sash interlocks with the window sill when the lower sash is fully closed.

As here disclosed a lower sash generally designated 2 and an upper sash generally designated 4 are mounted within a window frame generally designated 6 for vertical slidable movement, the lower sash 2 being mounted in front of the upper sash 4, as is conventional. The frame 6 comprises side rails 8, a top rail 10 and a sill 12 defining a rectangular enclosure and mounted in any suitable manner in an outer framework 14 adapted to be secured within an appropriate enclosure in a building, wall or the like. The side rails 8 are defined by a wall 16 from which a pair of vertical guide members 18 and 20 extend, a vertical groove 22 being defined between the members 18 and 20, the forward guide member 18 projecting from the wall 16 for a lesser distance than the rear guide member 20. A wall 24 of the outer framework 14 extends vertically behind the member 20, a groove 26 being defined therebetween, the wall 24 projecting inwardly beyond the guide member 20. Each of the guide members 18 and 20, along their inner ends, may be provided with a retaining lip 28 (see Fig. 3). The sill 12 is defined by a horizontal wall 30 having a vertical lip 32 extending thereacross and projecting up therefrom, and having a raised lip 34 at the front thereof within which a pair of cutouts 36 are provided. The wall 30 has a rear depending extension 38 secured to a portion of the outer frame 14 by means of screws 40, and it also has a fairly extensive forward vertical wall 42. These parts are all retained in assembled relationship in conventional manner.

The lower sash 2 comprises a top frame member 44, a bottom frame member 46 and side frame members 48 between which a pane 50 of glass or the like is secured in conventional manner. The frame members are fastened together in any appropriate way, as by the use of L-shaped soft metal members 52 and 52' (see Fig. 6) secured to the top and bottom sash frame members 44 and 46 respectively by means of dimples 54 and secured to the side sash frame members 48 by means of screws 56. The L-shaped member 52' differs from the L-shaped member 52 in that it carries a lug 58 which extends up from the top sash frame member 44 and then projects out beyond the side edge thereof. It will be noted (see especially Figs. 8–10) that the outer edges of the side sash frame members 48 are flat or substantially so. The width of the lower sash 2 is substantially equal to the distance between the facing edges of the guide members 18 on the rails 8, and the thickness of the lower sash 2 is substantially the same as the distance from the front surface of the guide member 20 to the front surface of the guide member 18. Hence the lower sash 2 is received in the frame between the guide members 18 and with its rear surface sliding over that portion of the guide member 20 which projects inwardly beyond the guide member 18. It will be appreciated that as thus far described nothing prevents the sash 2 from falling out of the frame through the front thereof.

The bottom sash frame member 46 (see Figs. 5, 8, 9 and 11) has a channel-shaped upper portion defined by horizontal wall 60 and vertical walls 62 between which the glass pane 50 is secured, as is the case with the other sash frame members 44 and 48. Its lower edge, however, is not substantially flat. It has an outer vertically depending wall 64 and an inner vertically depending wall 66 defining an open-bottomed channel 68 therebetween, the bottom of that channel being partially closed by means of retaining lips 70 extending inwardly from the walls 64 and 66. This channel 68 is also open at the sides of the frame member 46. The outer vertically depending wall 64 projects down an appreciable distance below the lips 70.

Mounted within the groove 68 at each end thereof is a rod 72, that rod being rotatable within the groove 68 but being larger than the open bottom defined between the lips 70, the rod 72 thus remaining within the groove 68. Projecting out from a side of the rod 72 is a finger piece 74, the inner depending wall 66 being cut away at 76 opposite the finger piece 74. A torsion spring 78, here shown in the form of an elongated wire, extends within the groove 68, a reversely bent end 80 thereof being substantially non-rotatively retained within the groove 68 by reason of the non-circular cross section of that groove, and the other end 82 thereof being secured to the rod 72 so as to urge that rod to rotate within the groove 68 in such a direction as to cause the finger piece 74 to move toward the outer depending wall 64.

Secured to the outer end of the rod 72, and preferably integral therewith, is a head 84 which projects out laterally from the side of the sash 2, a toothed element 86 of comparatively hard material projecting from a side of the head 84. The head 84 will, of course, rotate with the rod 72. The head 84 with its toothed element 86 is adapted to be received within and slide along the groove 22 between the side rail guide members 18 and 20. The width of the groove 22 is greater than the thickness of the head 84, but is less than the sum of the thickness of the head 84 and the length of the toothed element 86. Consequently, when the head 84 and the toothed element 86 are thus received within the groove 22, the spring 78 will cause the head 84 to rotate until the toothed element 86 engages one of the side surfaces of the groove 22, here shown as the forwardly facing surface of the guide member 20. As may be seen from Fig. 8, the toothed element 86 is so oriented with respect to the finger piece 74 that it engages with the surface of the guide element 20 before the finger piece 74 engages the wall 64 of the bottom sash frame member 46, the finger piece 74 then extending substantially vertically below the groove 22.

When the parts assume the position shown in Fig. 8, two results follow. In the first place, the head 84, although narrower than the width of the groove 22, will be forced against the rearwardly facing groove surface on the guide member 18, or at least against the lip 28 thereon. Hence the spring 78 acts through the rod 72, head 84 and toothed member 86 to prevent the head 84 from rattling within the groove 22. Secondly, because of the angularity of the toothed member 86 with respect to the surface of the guide member 20 which it engages, vertical movement of the sash 2 is positively prevented in at least one direction. As here disclosed, the toothed member 86 is inclined downwardly, and consequently any attempt to manually push the sash 2 downwardly, or any tendency of the sash 2 to fall of its own weight, will be positively resisted, the toothed member 86 digging into the surface of the guide member 20. The greater the force exerted on the sash 2 to move it downwardly, the more will the toothed member 86 dig in, and consequently the sash will be reliably held against downward movement. It will, however, be possible to move the sash upwardly without removing the toothed member 86 from the surface with which it is in engagement, the toothed member 86 sliding therealong.

Of course, if it is desired to eliminate even the frictional resistance of the toothed member 86 against its engaged surface and of the head 84 against its engaged surface, the retaining means defined by the head 84 and toothed member 86 may be moved to inoperative or released position. Moreover, it will be necessary to move the toothed member 86 to inoperative or released position if the sash 2 is to be lowered. This is very readily accomplished by grasping the finger piece 74 and pulling it forwardly toward the front of the window, the cutout 76 permitting this movement. When this is done the rod 72 is rotated, and the head 84 correspondingly rotates, the toothed member 86 thus being withdrawn from the surface of the guide members 20 (see Fig. 9). This movement is accomplished against the action of the spring 78. After the sash 2 has been readjusted in desired position, the finger piece 74 is released, the spring 78 causes the rod 72 to rotate in a direction opposite to that in which it has been moved, and the parts assume the position shown in Fig. 8, the sash 2 being itself positively and automatically retained in its newly adjusted position. It will be noted that since the finger piece 74 is moved forwardly to position the toothed member 86 in inoperative position, the finger piece 74 will therefore be, in effect, a handle by means of which the sash 2 may be lifted or by means of which its descent may be controlled. This contrasts markedly with prior art constructions, in which the locking member must first be manually manipulated to inoperative position and then released, after which the operator must grasp the sash in order to move it to its new position, the operator then having to manually regrasp the locking means in order to move it back to locking position.

As has previously been noted, the particular orientation of the toothed member 86 as here disclosed permits the sash 2 to be raised even though the toothed member 86 is in engagement with the inner surface of the guide member 20. This facilitates raising of the sash 2, but also permits the sash 2 to be lifted from the outside of the window. This, if not limited, is generally undesirable, and ordinarily requires the use of separate locking apparatus, conventionally connecting the upper and lower sashes 2 and 4 when they are in fully closed position, to prevent such unwanted raising of the lower [shash] *sash* 2. According to the present invention a proper degree of security is achieved without having to use any additional attachments. The lower end of the finger piece 74 has a rearwardly facing hook 88 engageable with a forwardly facing edge 90 of the horizontal wall 30 of the sill 12 at the cutout 36 of the raised lip 34 when the bottom sash 2 is in fully lowered position (see Fig. 5). The finger piece 74 is permitted sufficient forward movement to permit this engagement by means of the vertical extent of the cutout 76. The spring 78 serves to retain the hook 88 in locked engagement with the sill edge 90, and so long as this interengagement obtains the sash 2 cannot be raised. However, by grasping the thus interengaged finger piece 74 from the inside of the window and lifting it against the action of the spring 78 the interengagement between the hook 88 and the sill edge 90 is broken, further lifting pressure on the finger piece 74 causing the sash 2 to rise, the finger piece 74 then engaging the upper edge of the cutout 76 so that the lifting force exerted on the finger piece 74 is directly transmitted to the sash 2. It will be understood that in this position of the finger piece 74 the toothed member 86 is in inoperative position.

In some instances it might be awkward to hold the finger piece 74 and cause the sash 2 to descend to its fully closed position. Consequently the finger piece 74 is provided with a cam surface 92 which, as the sash 2 is lowered, is adapted to be brought into engagement with the upper surface of the horizontal sill wall 30 before the sash 2 has reached its fully closed position and while the finger piece 74 is moved forwardly with respect to its operative position so as to disengage the toothed member 86 from the surface of the guide member 20. Such a position is illustrated in Fig. 11. If, after this position is reached, the sash 2 should be pushed downwardly, as by pressure exerted on the upper surface of the top frame member 44 thereof, the sash 2 will move downwardly and the cam surface 92 will slide over the horizontal sill wall 30, the arm 74 being moved still further forwardly through the cutout 36 until the hook 88 passes the sill edge 90. When this occurs, the spring 78 will cause the finger piece 74 to swing rearwardly, and the hook 88 [wil] *will* engage with the sill edge 90. It will be noted that when the bottom sash 2 is in its fully closed position the lower part of the rear depending wall 64 will engage behind the upwardly projecting sill wall 32, thus sealing the bottom of the window opening against drafts and also preventing the insertion of a tool between the sash 2 and sill wall 30 to cause release of the hook 88.

The upper end of the sash 2 is constrained to slide vertically along the rail 8 and is prevented from moving forwardly out therefrom by means of the laterally extending lugs 58 which extend into and slide along the grooves 22 in the side rails 8. The lugs 58 are so positioned that when the rear surface of the sash frame rides on the forward surface of the guide member 20, the front surfaces of the lugs 58 are extremely close to and are slidable along the rear surfaces of the lips 28 on their respective guide members 18, thus preventing rattling of the upper ends of the sash 2. It will further be apparent that as here specifically disclosed the lugs 58 and the heads 84 constitute the sole means holding the sash 2 in operative connection with the side rails 8.

Only one side of the lower sash 2 has been described. The other side thereof is substantially identical as here disclosed, but it is not beyond the scope of my invention to construct the other side of the sash in a different manner. The structure here specifically disclosed will produce equalized retaining effects on both sides of the sash, that being generally preferred, but in some circumstances it might only be necessary to provide a retaining means (the head 84 and toothed member 86) on one side of the sash. In this specific disclosure two separate rods 72, finger pieces 74, springs 78 and heads 84 are provided, but it would be possible without departing from the present invention to provide a single rod 72 extending the full width of the sash, or to provide a single finger member 74 operatively connected in any appropriate manner to both heads 84 in order to move them simultaneously. The use of a pair of individual acting finger members 74 is, however, preferred because when those finger members 74 are utilized as handles to lift or control the lowering of the sash, their location one at each side of the sash overcomes any tendency of the sash to cant while it is being moved, such canting often given rise to binding between the side rails 8.

The construction of the upper sash 4 is substantially the same as that of the lower sash 2, except its width is somewhat less because the upper sash 4 is adapted to fit between the guide members 20, the inwardly facing edges of those guide members on the opposite rails 8 being more closely spaced than the corresponding edges of the guide members 18 between which the lower sash 2 is slidable. The lugs 58 and the heads 84 on the upper sash 4 slide within the groove 26 defined between the guide member 20 and the wall 24 of the outer frame 14, and the rear surface of the upper sash 4 slides over that portion of the outer frame wall 24 which projects inwardly beyond the guide member 20. The finger pieces 74' depending from the upper sash 4 are comparable to the finger pieces 74 of the lower sash 2, except that they are not provided with hooks 88 or cam surfaces 92.

Figure 1:
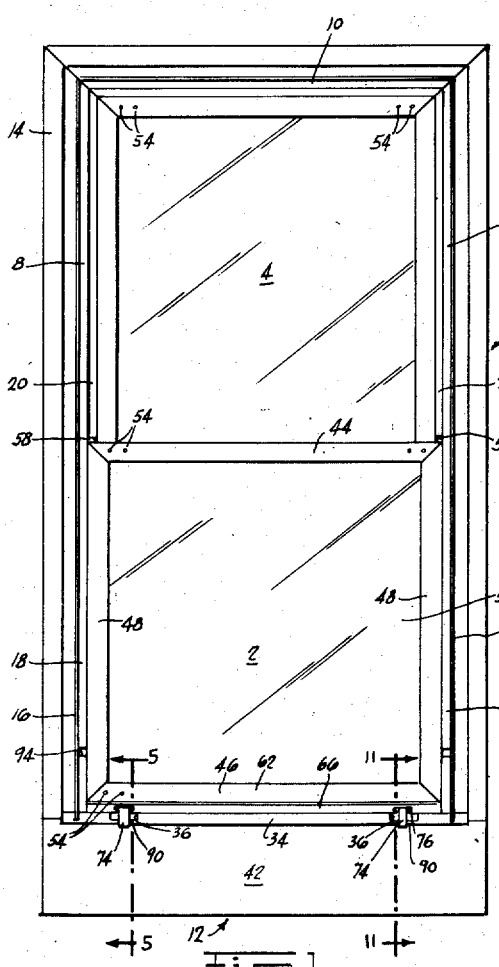
Fig. 1 is a front elevational view of the window of the present invention with both the lower and upper sashes in fully closed position.
Figure 2:
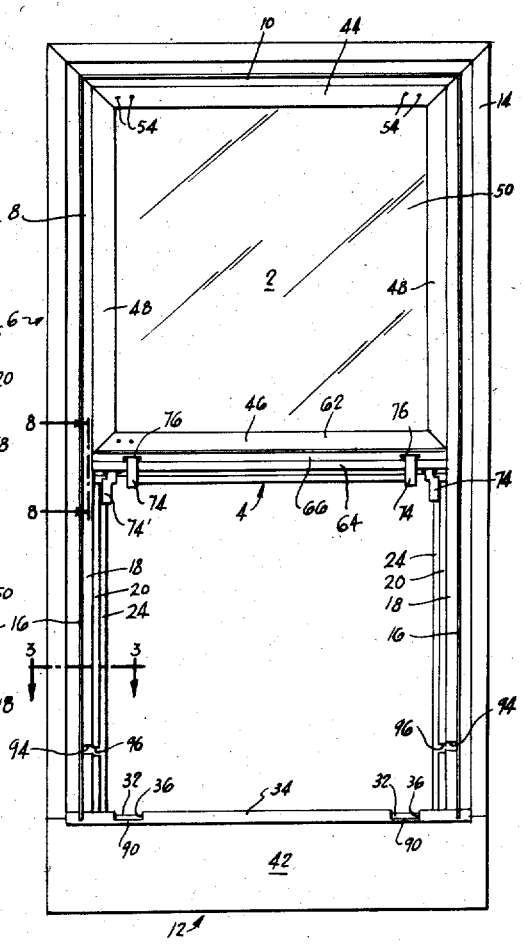
Fig. 2 is a view similar to Fig. 1 but showing the lower sash in fully raised position.

The lower sash 2, which is in front of the upper sash 4, is closely positioned relative thereto. Consequently, whenever any portion of the lower sash 2 is opposite the finger members 74', those finger members cannot be moved forwardly, and as a result the retaining means for the upper sash 4 cannot be released and the upper sash 4 cannot be lowered. It is only when the lower sash 2 is raised to the extent shown in Fig. 2, its lower edge clearing the finger pieces 74' on the upper sash 4, that those finger pieces 74' can be moved forwardly so as to position the upper sash retaining member in inoperative released position and permit that upper sash 4 to be lowered. Consequently, the lower sash 2 can be substantially no taller than the upper sash 4, unless special clearance is provided at the upper end of the frame 6 to permit the lower sash 2 to be raised sufficiently to clear the finger pieces 74'. It will be appreciated that as a result of this cooperation, the window of the present invention, when once closed, cannot be opened from the outside without breaking a pane of glass. The lower sash 2 cannot be raised because of the inter-engagement between the hooks 88 and the sill edges 90, and the upper sash 4 cannot be lowered until the lower sash 2 has been raised. It will further be apparent that this cooperation is achieved without using any special or extra equipment or attachments.

The guide members 18 and 20 are provided with slots 94 and 96 respectively through which the laterally projecting portions of the lugs 58 and the heads 84 with their toothed members 86 are passable. Hence the sashes 2 and 4 may readily be removed from or replaced in the frame. To insert a sash the lugs 58 are passed through the appropriate slot 94 or 96, the lugs are then slid upwardly along the groove 22 or 26 until the heads 84 come opposite the slots 94 or 96, those heads are then passed through the slots into the respective grooves, the sash is moved up or down, and it is then completely mounted. Removal of the sash is accomplished by merely reversing those operations.

The extreme simplicity of the parts and the small number of parts involved in the window mounting arrangement of the present invention are extremely significant, even when considered alone and apart from their manner of function. The guide rails 8 have a comparatively simple configuration, and the top and side sash frame members 44 and 48 are simple in the utmost, having smooth flat outer surfaces. When to this is added the consideration that this simple and positively and automatically acting structure produces a mode of operation which facilitates manually raising and lowering of the sashes, prevents the sashes from rattling even when subjected to strong wind gusts, and reliably holds the sashes in adjusted position, preventing them from being lowered even when the strongest forces are applied thereto, the true significance of this invention becomes apparent. Moreover, the structure lends itself to the production of a window in which, when the sashes are moved to fully closed position, those sashes will be locked in that position, will be unopenable from the outside of the window, and will be openable from the inside only when the locking structure is manually disengaged, and all this without employing a single additional structural element.

While but one embodiment of the invention has been here disclosed, it will be apparent that many variations will be made therein, all within the spirit of the invention as defined in the following claims.

I claim:

1. A window mounting arrangement comprising side rails, a window sash vertically slidably mounted between said rails, at least one of said rails having a vertical groove in the inner surface thereof, *said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including* a head projecting laterally from and articulately mounted on said sash and extending into and slidable within said groove, a tooth projecting from said head within said groove for a given distance, said distance plus the appropriate dimension of said head exceeding the corresponding dimension of said groove, resilient means active on said head so as to urge it to move so that said tooth engages [a surface] *one of said surfaces* of said groove in said rail [so as to prevent movement of said sash in at least one direction] *and so that the sash engages the opposite surface of the groove,* and a movable handle operatively connected to said head, accessible from the exterior of said sash, and effective when moved to cause said head to move against the action of said resilient means until said tooth is withdrawn from said groove surface[, thereby releasing said sash for movement].

2. The window mounting arrangement of claim 1, in which the lower end of said sash is horizontally recessed, said head being operatively connected to a rod which is received within said recess, said resilient means being also received within said recess and connected to said rod.

3. The window mounting arrangement of claim 2, in which said rod and said head are rotatably mounted, said tooth projects from a side of said head so as to engage [a side surface] *one of said surfaces* of said groove, and said resilient means comprises a resilient torsion member one end of which is substantially non-rotatively fixed within said recess and the other end of which is operatively connected to said rod.

[4. The window mounting arrangement of claim 2, in which said handle is connected to said rod and projects out from said recess.]

[5. The window mounting arrangement of claim 2, in which said handle is connected to said rod, said sash having an aperture in registration with said handle and said handle normally projecting out through said aperture in a generally vertical direction, said aperture being sufficiently large to permit said handle sufficient freedom of movement to cause said tooth to withdraw from the groove surface against which is is urged into engagement by said resilient means.]

6. The window mounting arrangement of claim 2, in which said rod and said head are rotatably mounted, said tooth projects from a side of said head so as to engage [a side surface] *one of said surfaces* of said groove, said resilient means comprises a resilient torsion member one end of which is substantially non-rotatably fixed within said recess and the other end of which is operatively connected to said rod, and said handle is connected to said rod, said sash having an aperture in registration with said handle and said handle normally projecting out through said aperture in a generally vertical direction, said aperture being sufficiently large to permit said handle enough freedom of movement about the axis of said rod so as to cause said tooth to be withdrawn from the groove surface against which it is urged by said resilient means.

7. The window mounting arrangement of claim 1, in which a sill extends between said rails at their bottom, said sill having an edge, said handle projecting down beyond the bottom of said sash and carrying a hook engageable around said edge so as to lock said sash in its lowered position.

8. The window mounting arrangement of calim 7, in which said handle includes a cam means engageable with said sill as said sash is lowered and before said sash is moved to fully lowered position, said cam means and said sill cooperating as said sash is further lowered to cause said handle to move relative to said sash until said hook engages around said edge, this occuring when said sash has been fully lowered.

[9. The window mounting arrangement of claim 1, in which said sash slides on said one of said rails entirely outside said groove, said sash having a laterally projecting lug vertically spaced from but substantiallly in line with said head which is also received and slidable within said groove, said head and said lug defining the sole means by which said sash is retained on said one of said rails.]

10. A window mounting arrangement comprising side rails, a window sash vertically slidably mounted between said rails, at least one of said rails having a vertical groove in the inner surface thereof, *said groove having a front surface and a back surface and a transverse cross-section which is uniform in a direction longitudinally of the groove, said front and back surfaces of said groove extending longitudinally in a direction parallel to the plane of the sash, means movable with the cash to engage the front or back surface of the groove, said means including* a head projecting laterally from and articulately mounted on said sash and extending into and slidable within said groove, a tooth projecting from said head within said groove for a given distance, said distance plus the appropriate dimension of said head exceeding the corresponding dimension of said groove, resilient means active on said head so as to urge it to move so that said tooth engages [a surface] *one of said surfaces* of said groove in said rail, said tooth being inclined downwardly when it thus engages said groove surface so as to prevent lowering of said sash but not preventing raising thereof *and so that the sash engages the opposite surface of the groove,* and a movable handle operatively connected to said head, accessible from the exterior of said sash, and effective when moved to cause said head to move against the action of said resilient means until said tooth is withdrawn from said groove surface, thereby releasing said sash for movement.

11. The window mounting arrangement of claim 10, in which the lower end of said sash is provided with a horizontal open-bottomed channel having a retaining lip partially closing the open bottom thereof and having an open end facing said one of said rails, a rod rotatably mounted in said channel and wider than the open bottom thereof so as to be retained therein by said lip, said head being operatively connected to said rod adjacent the open end of said channel so as to rotate therewith, said tooth projecting from a side of said head, said resilient means also being received within said channel and operatively connected to said rod so as to cause said rod to rotate in such a direction as to bring said tooth into engagement with one of the side surfaces of said groove.

[12. The window mounting arrangement of claim 11, in which said handle is connected to said rod and projects out through the open bottom of said channel.]

[13. The window mounting arrangement of claim 11, in which said handle is connected to said rod, the front wall of said sash along said channel being cut away opposite said handle, said handle thereby being provided with freedom of forward movement about the axis of said rod.]

[14. A window mounting arrangement comprising side rails each having two horizontally spaced vertical guide members the rear one of which projects inwardly more than the forward one, a vertical groove being defined between each pair of said members, a window sash having top, bottom and side frame members vertically slidably mounted between said rails, said side sash frame members fitting substantially snugly between said forward rail guide members and overlapping said rear rail guide members, lugs projecting laterally from the upper ends of said sash frame and receivable within and slidable along said grooves, heads projecting laterally from and rotatably mounted on the lower ends of said sash frame and extending into and slidable along said grooves, a tooth projecting from a side of each of said heads for a given distance within said groove, said distance plus the thickness of said head exceeding the width of said groove, resilient means active on said head so as to urge it to rotate so that said tooth engages a surface of said groove defined between a given pair of members, said tooth being inclined downwardly when it thus engages said groove surface so as to prevent lowering of said sash but not preventing raising thereof, and a movable handle means operatively connected to said heads, accessible from the exterior of said sash, and effective when moved to cause said heads to rotate against the action of said resilient means until their respective teeth are withdrawn from the groove surfaces, thereby permitting said sash to be lowered.]

[15. The window mounting arrangement of claim 14, in which a sill extends between said rails at their bottom, said sill having an edge, said handle means projecting down beyond said bottom sash frame member and carrying a hook engageable around said edge when said sash is lowered so as to lock said sash in its lowered position.]

[16. The window mounting arrangement of claim 15, in which said handle means includes a cam means engageable with said sill as said sash is lowered and before said sash is moved to fully lowered position, said cam means and said sill cooperating as said sash is further lowered to cause said handle means to move relative to said sash frame member until said hook engages around said edge, this occurring when said sash has been substantially fully lowered.]

17. A window mounting arrangement comprising a window frame having side rails and a sill, front and rear sashes vertically slidable between said rails, said front sash being substantially no taller than said rear sash, said front sash being of a size such as, when lowered, to close the lower portion of said window and said rear sash being of a size such as, when raised, to close the upper portion of said window, movable means operatively connected between said sashes and said frame and effective when in operative position to prevent at least downward movement of said sashes, said means being movable to inoperative position via handles operatively connected thereto so as to permit movement of said sashes, said handles being movable forwardly toward the front of said frame to move said means to inoperative position, the handle on said rear sash extending down from the lower edge thereof to the rear of said front sash, said front sash being of a size such as to normally obstruct the forward movement of said rear sash handle and thus preventing lowering of said rear sash except when said front sash is raised so that its lower edge is not substantially lower than the lower edge of said rear sash, 18. The window mounting arrangement of claim 17, in which the handle on said front sash extends down from the lower edge thereof and carries a rearwardly extending hook, said sill having a forwardly extending edge around which said hook is engageable when said front sash is substantially fully lowered so as to prevent raising of said front sash except when said hook is disengaged from said edge, such disengagement being accomplishable only from the front of said frame.

19. The window mounting arrangement of claim 18, in which the handle on said front edge includes a cam means engageable with said sill as said front sash is lowered and before said front sash is moved to fully lowered position, said cam means and said sill cooperating as said sash is further lowered to cause said handle to move relative to said front sash until said hook engages around said edge, this occurring when said front sash has been substantially fully lowered.

20. A window mounting arrangement comprising side rails, a window sash vertically slidably mounted between said rails, at least one of said rails having a vertical groove in the inner surface thereof, *said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including* a member projecting laterally from and articulately mounted on said sash and extending into and slidable within said groove, said member having a rail-gripping surface thereon, resilient means active on said member so as to urge it to move so that said rail-gripping surface engages [a surface] *one of said surfaces* of said groove in said rail so as to prevent movement of said sash in at least one direction *and so that the sash engages the opposite surface of the groove,* and a movable handle operatively connected to said member, accessible from the exterior of said sash, and effective when moved to cause said member to move against the action of said resilient means until said rail-gripping surface is withdrawn from said grooved surface, thereby releasing said sash for movement.

21. A window mounting arrangement comprising side rails, a window sash vertically slidably mounted between said rails, at least one of said rails having a vertical groove in the inner surface thereof, *said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including* a member projecting laterally from and rotatably mounted with respect to said sash and extending into and slidable within said groove, a side of said member being defined by a rail-gripping surface, the width of said member exceeding the width of said groove, the thickness of said member being less than the width of said groove, resilient means active on said member so as to urge it in a direction such that its width is parallel to the width of said groove, the rail-gripping surface of said members thus engaging [a side surface] *one of said surfaces* of said groove in said rail so as to prevent movement of said sash in at least one direction *and so that the sash engages the opposite surface of the groove,* and a movable handle operatively connected to said member, accessible from the exterior of said sash, and effective when moved to cause said head to rotate until its thickness is approximately parallel to the width of said groove, thus causing said rail-gripping surface to withdraw from said groove surface, thereby releasing said sash for movement.

22. The window mounting arrangement of claim 21, in which a sill extends between said rails at their bottom, said sill having an edge, said handle projecting down beyond the bottom of said sash and carrying a hook engageable around said sash so as to lock said sash in its lower position.

23. The window mounting arrangement of claim 22, in which said handle includes a cam means engageable with said sill as said sash is lowered and before said sash is moved to fully lowered position, said cam means and said sill cooperating as said sash is further lowered to cause said handle to move relative to said sash until said hook engages around said edge, this occurring when said sash has been fully lowered.

*24. A window mounting arrangement comprising side rails, a window sash vertically slidably mounted between said rails, at least one of said rails having a vertical groove in the surface thereof, said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including a member projecting laterally from and articulately mounted on said sash and extending into and slidable within said groove, said member having a rail-gripping surface thereon, resilient means active on said member so as to urge it to move so that said rail-gripping surface engages one of said surfaces of said groove in said rail and so that the sash engages the opposite surface of the groove, and a movable handle operatively connected to said member, accessible from the exterior of said sash, and effective when moved to cause said member to move against the action of said resilient means until said rail-gripping surface is withdrawn from said grooved surface.*

*25. A window mounting arrangement comprising side rails, a window sash vertically slidably mounted between said rails, at least one of said rails having a vertical groove in the inner surface thereof, said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including a member projecting laterally from and rotatably mounted with respect to said sash and extending into and slidable within said groove, a side of said member being defined by a rail-gripping surface, the width of said member exceeding the width of said groove, the thickness of said member being less than the width of said groove, resilient means active on said member so as to urge it in a direction such that its width is parallel to the width of said groove, the rail-gripping surface of said member thus engaging one of said surfaces of said groove and the sash engaging the other surface of the groove, and a movable handle operatively connected to said member, accessible from the exterior of said sash, and effective when moved to cause said head to rotate until its thickness is approximately parallel to the width of said groove, thus causing said rail-gripping surface to withdraw from said groove surface.*

*26. A window mounting arrangement comprising side rails, a window sash vertically slidably mounted between said rails, at least one of said rails having a vertical groove in the inner surface thereof, said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including a member projecting laterally from and movably mounted on said sash and extending into and*

*slidable within said groove, said member having a rail-engaging surface thereon, resilient means active on said member so as to urge it to move so that said rail-engaging surface engages one of said surfaces of said groove in said rail and so that the sash engages the opposite surface of the groove, and a movable handle operatively connected to said member, accessible from the exterior of said sash, and effective when moved to cause said member to move against the action of said resilient means until said rail engaging surface is withdrawn from said grooved surface.*

*27. A window mounting arrangement comprising side rails, a window sash vertically slidably mounted between said rails, at least one of said rails having a vertical groove in the inner surface thereof, said groove having a front surface and a back surface and a transverse cross-section which is uniform in a direction longitudinally of the groove, said front and back surfaces of said groove extending longitudinally in a direction parallel to the plane of the sash, means movable with the sash to engage the front or back surface of the groove, said means including a head projecting laterally from and articulately mounted on said sash and extending into and slidable within said groove, a protuberance projecting from said head within said groove for a given distance,*

*said distance plus the appropriate dimension of said head exceeding the corresponding dimension of said groove, resilient means active on said head so as to urge it to move so that said protuberance engages one of said surfaces of said groove in said rail and so that the sash engages the opposite surface of the groove, and a movable handle operatively connected to said head, accessible from the exterior of said sash, and effective when moved to cause said head to move against the action of said resilient means until said protuberance is withdrawn from said groove surface.*

References Cited in the file of this patent or the original patent

UNITED STATES PATENTS

| | | |
|---|---|---|
| 992,878 | Kaslopsky | May 23, 1911 |
| 1,625,295 | Contori | Apr. 19, 1927 |
| 2,113,959 | Campbell | Apr. 12, 1938 |
| 2,595,016 | Spector | Apr. 29, 1952 |
| 2,611,156 | Toth | Sept. 23, 1952 |
| 2,634,466 | Williams | Apr. 14, 1953 |
| 2,676,367 | Trammel et al. | Apr. 27, 1954 |
| 2,735,521 | Amerding | Feb. 21, 1956 |